(12) United States Patent
Mellot

(10) Patent No.: US 8,976,294 B2
(45) Date of Patent: Mar. 10, 2015

(54) MULTIPLE-SENSOR IMAGE ACQUISITION SYSTEM

(71) Applicant: STMicroelectronics (Grenoble 2) SAS, Grenoble (FR)

(72) Inventor: Pascal Mellot, Lans en Vercors (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 14/268,010

(22) Filed: May 2, 2014

(65) Prior Publication Data

US 2014/0333834 A1 Nov. 13, 2014

(30) Foreign Application Priority Data

May 7, 2013 (FR) ...................................... 13 54189

(51) Int. Cl.
*H04N 5/04* (2006.01)
*H04N 5/12* (2006.01)

(52) U.S. Cl.
CPC ...................................... *H04N 5/12* (2013.01)
USPC ......................................................... 348/500

(58) Field of Classification Search
USPC .......... 348/500, 536, 537; 384/201, 202, 204, 384/223
See application file for complete search history.

(56) References Cited

U.S. PATENT DOCUMENTS

| | | | | |
|---|---|---|---|---|
| 5,444,546 A * | 8/1995 | Fujimoto | ...................... | 386/204 |
| 7,046,977 B2 * | 5/2006 | Khlat et al. | ................... | 455/260 |
| 7,061,450 B2 * | 6/2006 | Bright et al. | ...................... | 345/7 |
| 7,679,454 B2 * | 3/2010 | Kuan et al. | ...................... | 331/11 |
| 7,728,634 B2 * | 6/2010 | De Rijk et al. | ................. | 327/105 |
| 7,889,239 B2 * | 2/2011 | Nakajima | ................ | 348/211.14 |
| 7,898,342 B2 * | 3/2011 | Jasniewicz et al. | ............... | 331/2 |
| 8,605,846 B2 * | 12/2013 | Felder et al. | ................... | 375/355 |
| 8,633,746 B2 * | 1/2014 | Norimatsu et al. | ........... | 327/156 |
| 8,736,700 B2 * | 5/2014 | Cote et al. | ................... | 348/222.1 |
| 2002/0041335 A1 * | 4/2002 | Taraci et al. | ................... | 348/511 |
| 2005/0174435 A1 * | 8/2005 | Nakajima | ................ | 348/211.99 |
| 2005/0216780 A1 * | 9/2005 | Sung et al. | ..................... | 713/500 |
| 2007/0097224 A1 * | 5/2007 | Haneda | ....................... | 348/221.1 |
| 2008/0174347 A1 | 7/2008 | Oshima | | |
| 2011/0157317 A1 | 6/2011 | Kamiya et al. | | |
| 2014/0062537 A1 * | 3/2014 | Kitsukawa et al. | ............ | 327/107 |

FOREIGN PATENT DOCUMENTS

WO WO-2004017544 A2 2/2004

OTHER PUBLICATIONS

INPI Search Report and Written Opinion for FR 1354189 mailed Jan. 15, 2014 (9 pages).

(Continued)

*Primary Examiner* — Paulos M Natnael
(74) *Attorney, Agent, or Firm* — Gardere Wynne Sewell LLP

(57) ABSTRACT

Each of a first and second image acquisition device includes: a circuit for providing a primary clock signal and a frequency synthesizing circuit capable of generating at least one secondary clock signal from said primary clock signal. The frequency synthesizing circuit in each image acquisition device has a fractional phase-locked loop configuration. A synchronization comparison circuit in each image acquisition device functions to compare sync between an external sync signal and an internal sync signal. An adjustment of the fraction phase lock loop operation is made in response to the sync comparison.

14 Claims, 1 Drawing Sheet

(56) References Cited

OTHER PUBLICATIONS

Guang-Jun Xie et al: "An All-Digital PLL for Video Pixel Clock Regeneration Applications", Computer Science and Information Engineering, 2009 WRI World Congress on, IEEE, Piscataway, NJ, USA.

Calbaza D E et al: "An ADPLL circuit using a DDPS for Genlock applications", Proceedings/2004 IEEE International Symposium on Circuits and Systems : May 23-26 2004.

\* cited by examiner

MULTIPLE-SENSOR IMAGE ACQUISITION SYSTEM

PRIORITY CLAIM

This application claims priority to French Application for Patent No. 1354189 filed May 7, 2013, the disclosure of which is incorporated by reference.

TECHNICAL FIELD

The present disclosure relates to a system comprising several digital image acquisition devices, and in particular concerns synchronizing image acquisition devices with respect to one another in such a system.

BACKGROUND

Systems comprising several image acquisition devices, for example, digital cameras, arranged to observe a same scene under different angles, or different portions of an extensive scene, have already been provided. In certain applications, it is desired to be able to synchronize image acquisition devices with one another, for example, so that integration periods of image sensors of different devices start and end at the same times. Usual synchronization solutions however raise various issues.

SUMMARY

Thus, an embodiment provides a system comprising at least two image acquisition devices, each comprising: a circuit for providing a primary clock signal; and a frequency synthesizing circuit capable of generating at least one secondary clock signal from said primary clock signal, the frequency synthesizing circuit comprising at least one fractional phase-locked loop.

According to an embodiment, the system further comprises a circuit for providing a first periodic synchronization signal.

According to an embodiment, each device further comprises a circuit for controlling the fractional value of the fractional phase-locked loop of its frequency synthesizing circuit, with the relative position of a second periodic synchronization signal, internal to said device, with respect to the first synchronization signal.

According to an embodiment, in each device, the period of the second synchronization signal is a multiple of the period of the secondary clock signal generated by the frequency synthesizing circuit of the device.

According to an embodiment, the circuit for providing the first synchronization signal is connected to the devices by wire connection.

According to an embodiment, the circuit for providing the first synchronization signal is connected to the devices by wireless connection.

According to an embodiment, in each device, the circuit for providing the primary clock signal of the device comprises a crystal oscillator.

According to an embodiment, the system further comprises a circuit for controlling the devices.

Another embodiment provides a method for synchronizing a system comprising at least two image acquisition devices, each device comprising a circuit for providing a primary clock signal, and a frequency synthesizing circuit capable of generating at least one secondary clock signal from the primary clock signal, the frequency synthesizing circuit comprising at least one fractional phase-locked loop, the method comprising: transmitting a first periodic synchronization signal to the devices; and in each device, controlling the fractional value of the fractional phase-locked loop of the frequency synthesizing circuit of the device with the relative position of a second periodic synchronization signal, internal to the device, with respect to the first synchronization signal.

According to an embodiment, in each device, the period of the second synchronization signal internal to the device is a multiple of the period of the secondary clock signal generated by the frequency synthesizing circuit of the device.

BRIEF DESCRIPTION OF THE DRAWINGS

The foregoing and other features and advantages will be discussed in detail in the following non-limiting description of specific embodiments in connection with the accompanying drawings wherein.

DETAILED DESCRIPTION OF THE DRAWINGS

Figure 1:
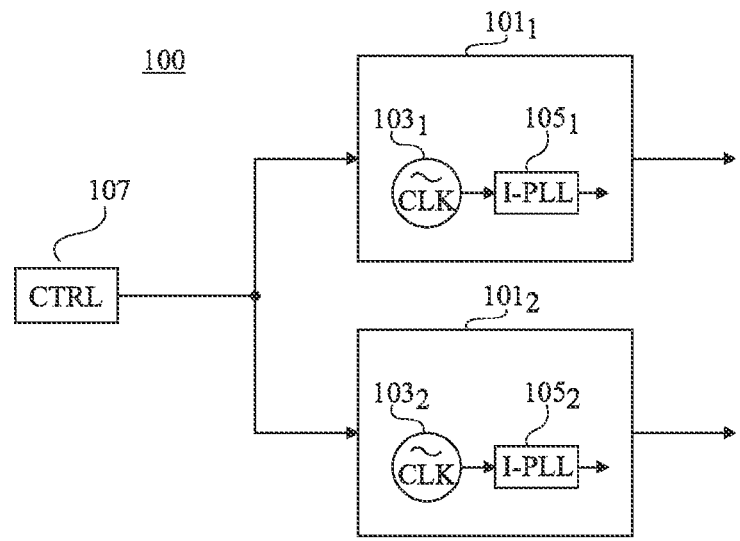
FIG. 1 schematically shows in the form of blocks an example of a system comprising several image acquisition devices.

For clarity, the same elements have been designated with the same reference numerals in the different drawings. Further, only those elements which are useful to the understanding of the embodiments which will be described have been shown and will be detailed. In particular, among the various elements comprised in an image acquisition device, only those elements capable of taking part in the synchronization of this device with other devices will be detailed. As concerns the other elements of an image acquisition device (image sensor, signal processing unit, image output interface, etc.), the described embodiments are compatible with usual components of an image acquisition device. Further, what use is made of the images acquired by the different image acquisition devices has not been detailed either, such a use being here again compatible with current uses of the images acquired by multiple-sensor systems (motor vehicle driver assist system, security, industrial optical inspection, etc.).

FIG. 1 schematically shows in the form of blocks an example of a system 100 comprising several image acquisition devices. In the shown example, system 100 comprises two image acquisition devices $101_1$ and $101_2$. Each image acquisition device $101_i$, i being an integer ranging from 1 to 2 in this example, comprises at least one image sensor (not shown), and may comprise various peripheral elements (not shown), for example, sensor pixel read circuits, a signal processing unit, a sensor control and parameterizing interface, a fast image output interface, registers for storing setting parameter, etc. In this example, each image acquisition device $101_i$ further comprises a circuit $103_i$ (CLK) for providing a primary clock signal at a reference frequency. As an example, circuit $103_i$ comprises a crystal oscillator providing a primary clock signal at a frequency approximately ranging from a few tens of kilohertz to a few megahertz, for example, ranging between 20 kHz and 20 MHz. Each device $101_i$ further comprises a frequency synthesizing circuit $105_i$, capable of generating, from primary clock signal provided by circuit $103_i$, one or several secondary clock signals having frequencies greater than or equal to the frequency of the primary signal, for example, ranging between 100 MHz and 1 GHz. For this purpose, circuit $105_i$ comprises at least one phase-locked loop, generally called PLL in the art, receiving the primary clock signal generated by circuit $103_i$ and delivering secondary clock signals of frequencies greater than or equal to the frequency of the primary circuit. In this example, the PLL of circuit $105_i$ is an integer PLL (I-PLL), that is, it provides secondary clock signals having, as frequencies, multiples of the frequency of the input signal (that is, the frequency of the primary clock signal delivered by circuit $103_i$ in this example). The secondary clock signal(s) generated by circuit $105_i$ are used to rate the different components of device $101_i$, and especially the cycles of integration/reading of the image sensor pixels of device $101_i$.

System 100 of FIG. 1 further comprises a circuit 107 (CTRL) for controlling image acquisition devices $101_1$ and $101_2$. Circuit 107 is connected to image acquisition devices $101_1$ and $101_2$, and is capable of controlling the starting or the stopping of phases of supply of an image flow or a video flow by devices $101_1$ and $101_2$. Circuit 107 may also communicate setting parameters to devices $101_i$, for example, parameters such as the integration time, the sensitivity, the sensor exposure level, etc. As an example, after the starting, via circuit 107, of an image acquisition phase, devices $101_i$ operate independently and no longer receive signals from circuit 107 until the stopping, via circuit 107, of the image acquisition phase.

The images acquired by devices $101_i$ may be provided to an external device, not shown, to be recorded, concatenated, analyzed, etc.

Thus, in system 100 of FIG. 1, each image acquisition device $101_i$ has its own primary clock or reference clock $103_i$, having a frequency which conditions secondary clock frequencies rating the device operating cycles, and especially the integration and read cycles of the device pixels. However, in practice, there often exists, between the reference frequencies provided by circuits $103_i$ of the different devices $101_i$, a slight difference resulting from manufacturing inaccuracies. Such a frequency difference, even minute, may cause a significant drift in the operating cycles of devices $101_i$ with respect to one another, when the system acquires image flows during relatively long time periods, with no interruption or reset. This may raise issues in certain applications.

To limit the time drift of the operating cycles of devices $101_i$ with respect to one another, it may be provided to periodically reset or restart devices $101_i$ via control circuit 107. However, this compels to regularly interrupt the image acquisition, which may be a problem in certain applications.

Figure 2:
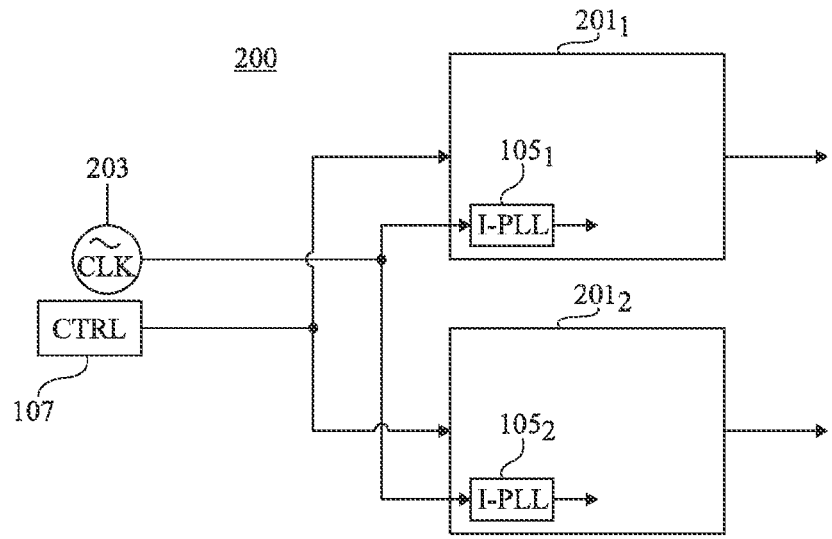
FIG. 2 schematically shows in the form of blocks another example of a system comprising several image acquisition devices.

FIG. 2 schematically shows in the form of blocks another example of a system 200 comprising several image acquisition devices. In the shown example, system 200 comprises two image acquisition devices $201_1$ and $201_2$. Each image acquisition device $201_i$, i being an integer ranging from 1 to 2 in this example, comprises at least one image sensor (not shown), and may comprise various peripheral elements (not shown).

A difference with the system of FIG. 1 is that, in system 200, devices $201_i$ do not have their own reference clock or primary clock as in the system of FIG. 1, but share a same circuit 203 (CLK), external to devices $201_i$, for providing a primary clock signal. As an example, circuit 203 comprises a crystal oscillator and provides a primary clock signal at a frequency approximately ranging from a few tens of kilohertz to a few MHz, for example, ranging between 20 kHz and 20 MHz.

Each device $201_i$ comprises, as in the example of FIG. 1, a frequency synthesizing circuit $105_i$, capable of generating, from primary clock signal provided by circuit 203, one or several secondary clock signals at frequencies greater than or equal to the frequency of the primary signal, for example, frequencies ranging between 100 MHz and 1 GHz. In this example, each circuit $105_i$ comprises, as in the example of FIG. 1, at least one integer phase-locked loop (I-PLL). The secondary clock signal(s) generated by each circuit $105_i$ are used to rate the different elements of the corresponding device $101_i$, and especially the cycles of integration/reading of the sensor pixels of device $101_i$.

System 200 of FIG. 2 further comprises a circuit 107 for controlling (CTRL) image acquisition devices $201_1$ and $201_2$, which may be similar or identical to circuit 107 of FIG. 1.

Thus, in system 200 of FIG. 2, a same reference clock 203 is shared by image acquisition devices $201_i$. This enables to avoid the above-mentioned problems of time drift of the operating cycles of the different image acquisition devices with respect to one another. However, this solution is not adapted to systems where a significant distance separates the image acquisition devices from one another. Indeed, the transmission of the primary clock signal generated by circuit 203 over a large distance poses various practical problems.

Figure 3:
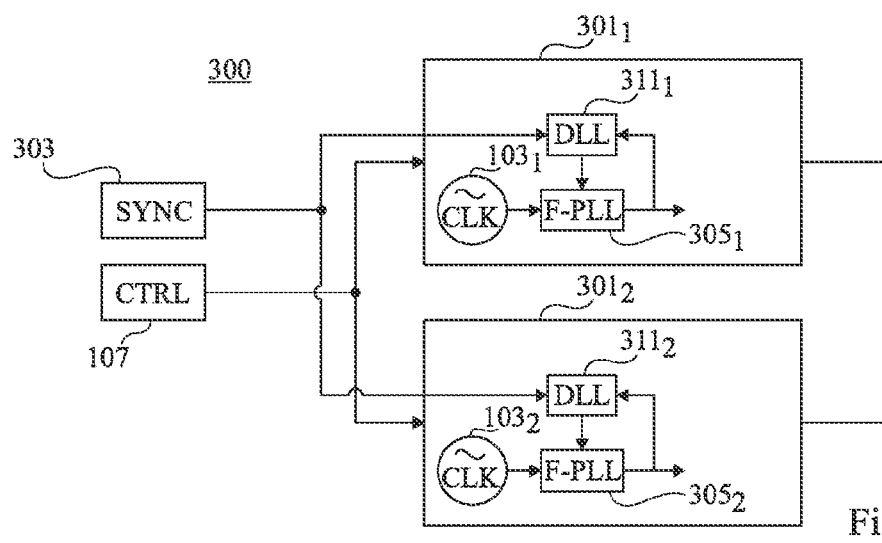
FIG. 3 schematically shows in the form of blocks an embodiment of a system comprising several image acquisition devices.

FIG. 3 schematically shows in the form of blocks an embodiment of a system 300 comprising several image acquisition devices. In the shown example, system 300 comprises two image acquisition devices $301_1$ and $301_2$. Each image acquisition device $301_i$, i being, in this example, an integer ranging from 1 to 2, comprises at least one image sensor (not shown), and may comprise various peripheral elements (not shown), for example, sensor pixel read circuits, a signal processing unit, a sensor control and parameterizing interface, a fast image output interface, registers for storing parameterizing data, etc. In this example, each image acquisition device $301_i$ comprises a circuit $103_i$ (CLK) for providing a primary clock signal at a reference frequency. As an example, circuit $103_i$ comprises a crystal oscillator, for example, a quartz oscillator, and provides a primary clock signal at a frequency approximately ranging from a few tens of kilohertz to a few megahertz, for example, ranging between 20 kHz and 20 MHz. Each device $301_i$ further comprises a frequency synthesizing circuit $305_i$, capable of generating, from primary clock signal provided by circuit $103_i$, one or several secondary clock signal shaving frequencies greater than or equal to the frequency of the primary signal, for example, ranging between 100 MHz and 1 GHz. For this purpose, circuit $305_i$ comprises at least one phase-locked loop PLL, receiving the primary clock signal generated by circuit $103_i$ and providing at least one secondary clock signal having a frequency greater than or equal to the frequency of the primary signal. The secondary clock signal(s) generated by circuit $305_i$ are used to rate the different elements of device $301_i$, and especially the cycles of integration/reading of the image sensor pixels of device $301_i$.

According to an aspect of the embodiment of FIG. 3, the PLL of circuit $305_i$ is a fractional PLL (F-PLL) that is, it is capable of delivering secondary clock signals at frequencies equal to the frequency of the received input signal (that is, the primary frequency delivered by circuit $103_i$ in this example), multiplied by a programmable fractional number or decimal number. Thus, for a given reference frequency applied at the input of circuit $305_i$, the number of different frequencies capable of being generated by circuit $305_i$ is much higher than the number of different frequencies capable of being generated by circuit $105_i$ of FIGS. 1 and 2. In other words, the frequency resolution or accuracy of frequency synthesizer $305_i$ is much higher than the frequency resolution or accuracy of frequency synthesizer $105_i$ of FIGS. 1 and 2.

According to another aspect of the embodiment of FIG. 3, system 300 further comprises a circuit 303 (SYNC) for synchronizing image acquisition devices $301_i$, external to devices $301_i$. Circuit 303 is capable of generating a periodic low-frequency synchronization signal and of transmitting the low-frequency signal to devices $301_i$. Low-frequency signal here means a signal capable of being easily transmitted (with no degradation) over long distances, for example, a signal having a period greater than or equal to 1 ms, and preferably ranging between 5 and 50 ms. The connection between circuit 303 and devices $301_i$ may be an electric wire connection or a wireless connection, for example, a radio connection.

Each device $301_i$ comprises a circuit $311_i$ capable of measuring the relative time position of a periodic synchronization signal internal to the device, with respect to the external synchronization signal originating from circuit 303. The internal synchronization signal may coincide (time wise) with a selected event of the cycle of image acquisition by device $301_i$, for example, a beginning or end time of an integration period of the image sensor. More generally, any periodic signal having its frequency correlated to the frequency of a secondary clock signal of device $301_i$, generated by frequency synthesizer $305_i$, may be used as an internal synchronization signal. Circuit $311_i$ is further capable of dynamically modifying the fractional value of the PLL of frequency synthesizer $305_i$, in reaction to the possible detection of a possible time drift of the internal synchronization signal with respect to the external synchronization signal, to correct this drift. For this purpose, circuit $311_i$ for example comprises a digital locked loop DLL receiving the two synchronization signals (internal and external), and acting on the fractional value of the PLL of circuit $305_i$, according to the time drift measured between the internal synchronization signal and the external synchronization signal. The programming of frequency synthesizing circuit $305_i$ is thus controlled by the measurement of the time drift between the internal and external synchronization signals provided to circuit $311_i$, to block this drift. As an example, circuit $311_i$ uses the programming of frequency synthesizing circuit $305_i$ to have the frequency of the internal synchronization signal or a multiple of this frequency coincide with the frequency of the external synchronization signal.

System 300 of FIG. 3 further comprises a circuit 107 for controlling (CTRL) image acquisition devices $301_1$ and $301_2$, which may be similar or identical to circuit 107 of FIGS. 1 and 2. Circuit 303 may comprise elements in common with control circuit 107, for example, a microprocessor. The connection between circuit 107 and devices $301_i$ may be a wire connection or a wireless connection.

An advantage of the embodiment of FIG. 3 is that the time drift of the operating cycles of devices $301_i$ with respect to one another, due to possible frequency differences between the primary clocks of these devices, is automatically corrected without it being necessary to interrupt the image acquisition.

Another advantage of the embodiment of FIG. 3 is that it is compatible with systems where significant distances separate the different image acquisition devices from one another. Indeed, the embodiment of FIG. 3 comprises no transmission of high-frequency signals between the different devices or between a common circuit and the different devices.

Specific embodiments have been described. Various alterations, modifications, and improvements will occur to those skilled in the art. In particular, the provided embodiments are not limited to the examples shown in the drawings of systems comprising two image acquisition devices. It will be within the abilities of those skilled in the art to implement the desired operation in systems comprising a number of image acquisition devices greater than two.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A system comprising:
    a circuit configured to provide a periodic synchronization signal;
    at least two image acquisition devices;
    wherein each image acquisition device comprises:
       a circuit configured to provide a primary clock signal; and
       a frequency synthesizing circuit configured to generate at least one secondary clock signal from said primary clock signal, said frequency synthesizing circuit comprising at least one fractional phase-locked loop; and
       a circuit configured to control a fractional value of the fractional phase-locked loop by comparing a relative time position of an internal periodic signal of the image acquisition device to said periodic synchronization signal, wherein a period of the internal periodic signal is a multiple of a period of the secondary clock signal.

2. The system of claim 1, wherein the internal periodic signal is derived from the secondary clock signal output from said fractional phase-locked loop.

3. The system of claim 2, wherein the internal periodic signal has a frequency correlated to a frequency of the secondary clock signal output from the fractional phase-locked loop.

4. The system of claim 1, wherein said circuit configured to provide the periodic synchronization signal is connected to said image acquisition devices by wire connection.

5. The system of claim 1, wherein said circuit configured to provide the periodic synchronization signal is connected to said image acquisition devices by wireless connection.

6. The system of claim 1, wherein within each image acquisition device the circuit configured to provide the primary clock signal of the device comprises a crystal oscillator.

7. The system of claim 1, further comprising a circuit configured to control said image acquisition devices.

8. A method, comprising:
    transmitting a first periodic synchronization signal to each of at least two image acquisition devices, wherein each image acquisition device comprises a circuit which provides a primary clock signal and a frequency synthesizing circuit including at least one fractional phase-locked loop and which generates at least one secondary clock signal from the primary clock signal; and
    controlling in each image acquisition device a fractional value of the fractional phase-locked loop of the frequency synthesizing circuit of the image acquisition device in response to a relative position of a second periodic synchronization signal, internal to the image acquisition device, compared with said first synchronization signal;
    wherein, in each image acquisition device, the period of the second synchronization signal internal to the image acquisition device is a multiple of the period of said at least one secondary clock signal generated by the frequency synthesizing circuit of the image acquisition device.

9. A system, comprising:
a circuit configured to generate a synchronization signal;
a first image acquisition device including:
   a first clock circuit configured to generate a first clock signal;
   a first fractional phase lock loop circuit configured to receive the first clock signal and generate a first output signal; and
   a first circuit configured to compare synchronization between the first output signal to the synchronization signal and generate a first control signal for application to adjust a fractional control of said first fractional phase lock loop circuit; and
a second image acquisition device including:
   a second clock circuit configured to generate a second clock signal;
   a second fractional phase lock loop circuit configured to receive the second clock signal and generate a second output signal; and
   a second circuit configured to compare synchronization between the second output signal to the synchronization signal and generate a second control signal for application to adjust a fractional control of said second fractional phase lock loop circuit.

10. The system of claim 9, further comprising a circuit configured to control an image taking function of both the first and second image acquisition devices.

11. The system of claim 9, wherein adjustment of the fractional control drives the internally generated sync signal towards synchronization with the output signal.

12. A system, comprising:
a circuit configured to generate a synchronization signal;
a circuit configured to generate an image control signal;
a first image acquisition device operable to take a first image in response to said image control signal and including:
   a first clock circuit configured to generate a first clock signal;
   a first fractional phase lock loop circuit configured to receive the first clock signal and generate a first output signal; and
   a first circuit configured to compare a synchronization between an internally generated sync signal relating to the taking of the first image to the synchronization signal and generate a first control signal for application to adjust a fractional control of said first fractional phase lock loop circuit; and
a second image acquisition device operable to take a second image in response to said image control signal and including:
   a second clock circuit configured to generate a second clock signal;
   a second fractional phase lock loop circuit configured to receive the second clock signal and generate a second output signal; and
   a second circuit configured to compare synchronization between an internally generated sync signal relating to the taking of the second image to the synchronization signal and generate a second control signal for application to adjust a fractional control of said second fractional phase lock loop circuit.

13. The system of claim 12, wherein adjustment of the fractional control drives the internally generated sync signal towards synchronization with the synchronization signal.

14. The system of claim 12, wherein a period of the internally generated sync signal is a multiple of a period of said output signal.

* * * * *